O. J. DORWIN.
MEASURING APPARATUS.
APPLICATION FILED MAY 22, 1915.
1,203,103.
Patented Oct. 31, 1916.
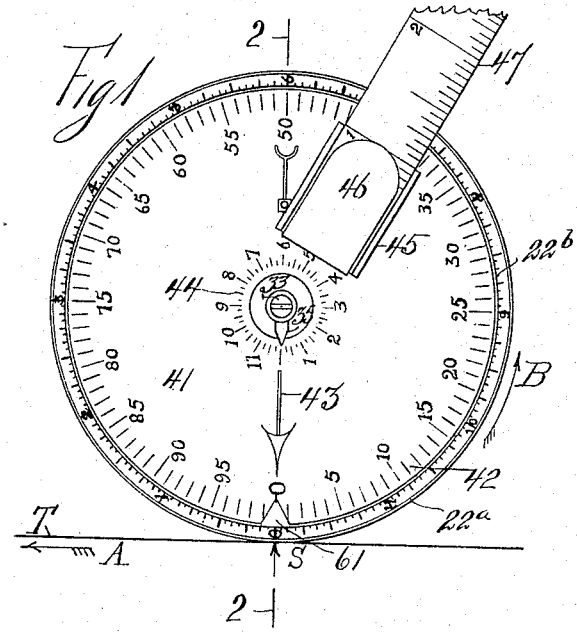
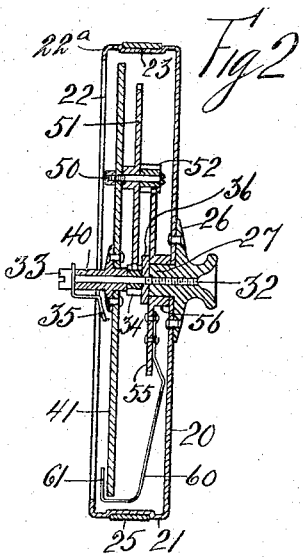
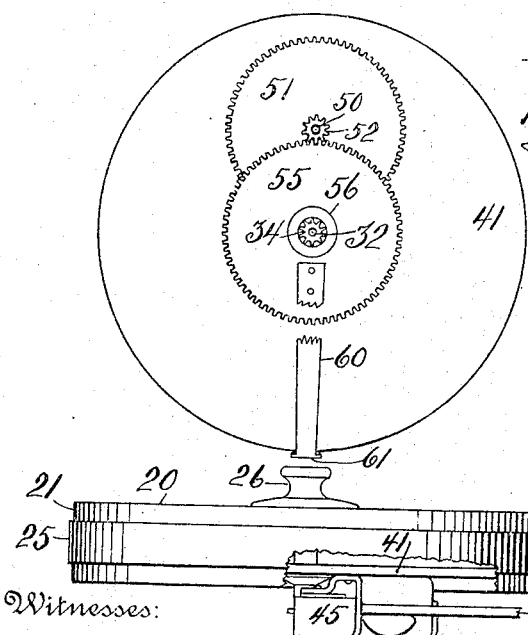
Witnesses:
Chas. A. Case
A. H. Baker
Inventor
Otis J. Dorwin
By his Attorney
A. A. de Bomeuille

UNITED STATES PATENT OFFICE.

OTIS J. DORWIN, OF NEW YORK, N. Y.

MEASURING APPARATUS.

1,203,103.  Specification of Letters Patent.  Patented Oct. 31, 1916.

Application filed May 22, 1915. Serial No. 29,706.

*To all whom it may concern:*

Be it known that I, OTIS J. DORWIN, a citizen of the United States, and a resident of the borough of Manhattan, in the county of New York and State of New York, have invented certain new and useful Improvements in Measuring Apparatus, of which the following is a specification.

This invention relates to a measuring apparatus which I will term herein a rotometer. Its organization comprises a cylindrical casing that is rolled on a surface to be measured, and which causes a pointer to take different positions. A dial plate in the apparatus which coacts with the pointer is maintained stationary when the casing is rolling.

In the drawings Figure 1 shows an elevation of the invention; Fig. 2 represents a section as on the line 2, 2, of Fig. 1; Fig. 3 is a top plan view of Fig. 1 with a portion broken away and Fig. 4 shows a rear view of some of the elements of the invention shown in Fig. 2.

The rotometer is shown with a cylindrical casing having the rear wall 20, circumferential wall 21, opening 22 and front rim 22$^a$. A scale 22$^b$ with twelve main divisions is indicated on the front rim 22$^a$. Each of the main divisions of the scale is divided into sixteen divisions. Each of the said main divisions represents one inch. A depression 23 is formed in the circumferential wall 21. A contact ring, preferably a band of pliable material 25, rubber or the like is supported in said depression 23. A bracket 26 with the boss 27 is fastened to the rear wall 20, and is threaded in its axial center. A pivot 32 with the head 33 is in threaded engagement with the said bracket 26, and has fastened thereto the pinion 34. A pointer 35 is fastened to the under side of the head 33 of the said pivot 32. A washer 36 is supported on the pivot 32 and is located between the pinion 34 and the boss 27. A sleeve bearing 40 is journaled on the pivot 32 and has fastened thereto the dial plate 41. A scale 42 is formed adjacent to the outer edge of the dial plate 41 and contains one hundred divisions, each division indicating one revolution of the casing of the apparatus. An arrow 43 is indicated on the dial plate 41. A scale 44 is indicated at the central portion of the dial plate, and the sum of its divisions indicates one revolution of the casing, the sum of the latter divisions being equal to one of the divisions of the scale 42. A clamping bracket 45 is fastened to the dial plate 41 and has connected thereto a clamping spring 46 to engage a handle 47 which in the present instance is shown to be a rule. A pivot 50 is fastened to the dial plate 41 and has journaled thereon the gear 51. A pinion 52 is fastened (in this instance soldered) to the gear 51 and is also journaled on the pivot 50. A gear 55 with the sleeve 56 is journaled on the boss 27. The gear 55 meshes with the pinion 52. A pointer 60 has one end fastened to the gear 55 and a hook end 61 is located over the scale 42.

To use the invention the user inserts the handle 47 in the clamping bracket 45, so as to be held in position by means of the tension of the spring 46. The dial plate 41 is brought to the position shown in Fig. 1, that is to say with the pointer end of the arrow 43 in line with the zero of the scale 42 and the zero of scale 22$^b$. The hook end 61 is brought opposite the zero of the scale 42 by rotating the casing, and thereby the zero of the scale 22$^b$ is also brought in line with the center of the hook end 61 and the arrow 43. The latter is accomplished by turning the casing having the rear wall 20 until said hook end 61 is so positioned. This will also locate the pointer 35 at its zero position. The measuring apparatus is then brought into contact with the surface T to be measured, with the zero division of the scale 42 over the starting point as indicated by the arrow S of the distance to be measured. The casing is then rolled on the surface T, that is to be measured, in the direction of the arrow A, which turns the said casing in the direction of the arrow B, and causes the hook end 61 to also travel in the direction of the arrow B. The dial plate 41 is maintained at rest, while the casing is rolling on the surface T by virtue of the handle 47 being clamped by the clamping spring 46, which latter is connected to the dial plate 41. The handle 47 remains at rest and under control of the operator and thereby the dial plate 41 remains at rest. With the turning of the casing the pointer 35 is moved the same angular distance, and the pinion 34 which is fastened to the pivot 32 turns. The gear 51 meshing with the pinion 34 is thereby turned. The pinion 52 turns with the gear 51, and said pinion 52 meshing with the gear 55 rotates the latter, and thereby the pointer 60 is caused to travel in the direction of the arrow B as already stated. The outside circumference of the band 25 in this instance equals one foot or twelve inches, and the gears are proportioned so that the hook end 61 will travel over one of the divisions on the scale 42 for one revolution of the casing. One of the twelve divisions on the scale 44 and scale $22^b$ corresponds to a distance measured by the apparatus of one inch.

Having described my invention what I desire to secure by Letters Patent and claim is:

1. The combination in a measuring apparatus of a cylindrical casing adapted to roll on a surface to be measured, a pivot carried by the casing, a dial plate supported on the pivot, a clamping bracket on the dial plate to maintain it at rest during the rolling of the casing, a pointer for the dial plate, connections between the casing and the pointer causing the latter to take different angular positions with respect to the dial plate when said casing is rolling.

2. The combination in a measuring apparatus of a cylindrical casing adapted to roll on a surface to be measured, a pivot carried by the casing, a dial plate supported on the pivot and having a scale marked thereon adjacent to the outer edge thereof and a second scale adjacent to its central portion, means to maintain the dial plate at rest during the rolling of the casing, a pointer secured to the pivot for the scale at the central portion of the dial plate, a second pointer in the apparatus for the scale at the outer edge of the dial plate, connections between the casing and the second pointer causing the latter to take different angular positions with respect to the dial plate when the casing is rolling.

3. The combination in a measuring apparatus of a cylindrical casing adapted to roll on a surface to be measured, a bracket with a boss fastened to the casing, a pivot carried by the bracket, a dial plate having a scale supported on the pivot, a pivot extending from the dial plate, a gear journaled on the latter pivot, a pinion extending from the latter gear coaxial therewith, a pinion fastened to the first pivot and meshing with said gear, a second gear journaled on the boss of said bracket meshing with the pinion extending from the first gear, a pointer extending from the second gear coacting with the scale on the dial plate and means to maintain the dial plate stationary while rolling the casing on a surface to be measured.

4. The combination in a measuring apparatus of a cylindrical casing adapted to roll on a surface to measure the length thereof, a pivot in the axial center of the casing and rotating therewith, a dial plate having a scale near its center and a second scale near its circumferential edge, a pointer extending from said pivot for the scale near the center of the dial plate, a second pointer in the casing with its axial center coincident with the axial center of the casing for the scale near the edge of the dial plate, and a train of gears in the casing actuated by the rolling of the said casing and causing the second pointer to swing to different positions.

5. The combination in a measuring apparatus of a cylindrical casing adapted to roll on a surface to be measured, a pivot rotating with said casing, a dial plate supported on the pivot, a clamping bracket extending from said dial plate adapted to hold a handle, ordinary folding rule and the like and thereby providing means to maintain the dial plate at rest during the rolling of the casing, a pointer for the dial plate, connections between the casing and the pointer, causing the latter to take different angular positions relatively to the dial plate when the said casing is rolling.

6. The combination in a measuring apparatus of a rotative cylindrical casing, a pliable contact ring on the cylindrical surface of said casing, a pivot rotating with the casing, a dial plate supported on the pivot, means to maintain the dial plate at rest during the rotation of the casing, a pointer for the dial plate, connections between the casing and the pointer causing the latter to take different angular positions with respect to the dial plate when said casing is rotating.

7. The combination in a measuring apparatus of a cylindrical casing having a front rim with a scale indicated thereon, said casing adapted to roll on a surface to be measured, a pivot turning with the casing, a dial plate with an arrow extending across its surface and having a scale indicated at its circumferential edge, the zero of the latter scale being at the head of said arrow, the said dial plate supported on the pivot, means to maintain the dial plate at rest during the rolling of the casing, a pointer for the dial plate coacting with the scale on said dial plate, the arrow on the dial plate coacting with the scale on the front rim of the said casing, connections between the casing and the pointer causing the latter to take different positions with respect to the dial plate when the casing is rolling.

Signed at the borough of Manhattan, in the county of New York and State of New York, this 7th day of May, A. D. 1915.

OTIS J. DORWIN.

Witnesses:
A. A. DE BONNEVILLE,
C. A. CASE.